United States Patent
Ko

(10) Patent No.: US 9,093,939 B2
(45) Date of Patent: Jul. 28, 2015

(54) MOTOR DRIVING CONTROL APPARATUS, MOTOR DRIVING CONTROL METHOD, AND MOTOR USING THE SAME

(71) Applicant: SAMSUNG ELECTRO-MECHANICS CO., LTD., Suwon, Gyunggi-do (KR)

(72) Inventor: Joo Yul Ko, Gyunggi-do (KR)

(73) Assignee: SAMSUNG ELECTRO-MECHANICS CO., LTD., Suwon, Gyunggi-Do (KR)

( * ) Notice: Subject to any disclaimer, the term of this patent is extended or adjusted under 35 U.S.C. 154(b) by 126 days.

(21) Appl. No.: 13/896,899

(22) Filed: May 17, 2013

(65) Prior Publication Data

US 2014/0167668 A1    Jun. 19, 2014

(30) Foreign Application Priority Data

Dec. 18, 2012    (KR) .................. 10-2012-0148250

(51) Int. Cl.
  *H02P 6/18* (2006.01)
  *H02P 27/08* (2006.01)
(52) U.S. Cl.
  CPC .............. *H02P 6/182* (2013.01); *H02P 27/085* (2013.01)
(58) Field of Classification Search
  CPC ....................................................... H02P 1/24
  USPC .............. 318/400.01, 400.06, 400.07, 400.1, 318/400.14, 400.15, 400.26, 400.27, 318/400.32, 400.33, 400.35, 400.38, 400.4, 318/701, 727, 599, 811, 801, 430, 432, 318/400.34; 388/800, 819, 909, 928.1
  See application file for complete search history.

(56) References Cited

U.S. PATENT DOCUMENTS

| | | | |
|---|---|---|---|
| 5,592,058 A * | 1/1997 | Archer et al. | 318/400.09 |
| 5,929,577 A * | 7/1999 | Neidorff et al. | 318/400.35 |
| 6,420,847 B1 * | 7/2002 | Galbiati et al. | 318/727 |
| 7,034,478 B2 * | 4/2006 | Bhaumik et al. | 318/400.35 |

(Continued)

FOREIGN PATENT DOCUMENTS

| | | |
|---|---|---|
| JP | 2000-83397 A | 3/2000 |
| JP | 2000-253692 A | 9/2000 |

(Continued)

OTHER PUBLICATIONS

Japanese Office Action issued in Japanese Application No. 2013-097605 dated Apr. 30, 2014, w/English translation.

(Continued)

*Primary Examiner* — Antony M Paul
(74) *Attorney, Agent, or Firm* — McDermott Will & Emery LLP

(57) ABSTRACT

There are provided a motor driving control apparatus, a motor driving control method, and a motor using the same. The motor driving control apparatus includes a driving signal generation unit, a back electromotive force detection unit, and a frequency controller. The driving signal generation unit may generate a driving control signal for controlling driving of a motor device. The back electromotive force detection unit may detect back electromotive force of the motor device. The frequency controller may provide control to estimate a zero crossing point of the back electromotive force, set a frequency modulation section including the zero crossing point, and modulate a frequency of the driving control signal during the frequency modulation section.

15 Claims, 6 Drawing Sheets

(56) References Cited

U.S. PATENT DOCUMENTS

| | | | |
|---|---|---|---|
| 8,093,847 B2* | 1/2012 | Otaguro | 318/400.35 |
| 8,339,077 B2* | 12/2012 | Brown | 318/400.13 |
| 8,450,959 B2* | 5/2013 | Chien et al. | 318/400.35 |
| 2011/0084635 A1* | 4/2011 | Brown | 318/400.13 |
| 2011/0084640 A1 | 4/2011 | Brown | |

FOREIGN PATENT DOCUMENTS

| | | | |
|---|---|---|---|
| JP | 2006-109623 A | 4/2006 |
| JP | 2009-261107 A | 11/2009 |
| JP | 2010-11542 A | 1/2010 |
| JP | 2012-075230 A | 4/2012 |
| KR | 2012-0084289 A | 7/2012 |

OTHER PUBLICATIONS

Notice of Office Action Korean Patent Application No. 10-2012-0148250 dated Jul. 28, 2014 with English translation.

* cited by examiner

MOTOR DRIVING CONTROL APPARATUS, MOTOR DRIVING CONTROL METHOD, AND MOTOR USING THE SAME

CROSS-REFERENCE TO RELATED APPLICATIONS

This application claims the priority of Korean Patent Application No. 10-2012-0148250 filed on Dec. 18, 2012 in the Korean Intellectual Property Office, the disclosure of which is incorporated herein by reference.

BACKGROUND OF THE INVENTION

1. Field of the Invention

The present invention relates to a motor driving control apparatus, a motor driving control method, and a motor using the same.

2. Description of the Related Art

In line with the development of motor technologies, motors having various sizes have been used in diverse technical fields.

In general, a motor is driven by rotating a rotor by using a permanent magnet and a coil having polarity changing according to an applied current. Initially, a brush type motor having a coil in a rotor was provided, which, however, had a problem in that a brush thereof was abraded or sparks were generated.

Thus, recently, various types of brushless motors have been used globally. A brushless motor, eliminating mechanical contact units such as a brush, a rectifier, or the like, is a DC motor driven by using an electronic commutating mechanism instead. The brushless motor may include a stator configured as a permanent magnet and a rotor having coils corresponding to a plurality of phases and rotating by magnetic force generated by phase voltages of the respective coils.

In order to effectively drive a brushless motor, commutation of respective coils of the stator is required to be made at an appropriate time, and such commutation may be made by performing switching on the respective coils.

For such switching, a driving control signal (e.g., a PWM) signal using a DC current is used, and such a driving control signal has a predetermined frequency. As a frequency of a driving control signal used in a motor device, a frequency band of 10 KHz to 30 KHz is generally used.

However, if the frequency of the driving control signal is low, capacitance required for a filter of the motor driving control apparatus is increased, resulting in a problem in that a size of a capacitor constituting a circuit is required to be increased.

Also, such increased capacitance lengthens a filtering delay, and such a delay generates ripples in the motor device, a factor degrading stability.

The related art document below relates to a motor technology, which, however, does not provide a solution to the foregoing problems.

RELATED ART DOCUMENT (Patent document 1) Korean Patent Laid Open Publication No. 2012-0084289

SUMMARY OF THE INVENTION

An aspect of the present invention provides a motor driving control apparatus capable of more accurately controlling driving of a motor by lowering capacitance of a filter by modulating a frequency in a section corresponding to a zero crossing point of back electromotive force, a motor driving control method, and a motor using the same.

According to an aspect of the present invention, there is provided a motor driving control apparatus. The motor driving control apparatus includes a driving signal generation unit, a back electromotive force detection unit, and a frequency controller. The driving signal generation unit may generate a driving control signal for controlling driving of a motor device. The back electromotive force detection unit may detect back electromotive force of the motor device. The frequency controller may provide control to estimate a zero crossing point of the back electromotive force, set a frequency modulation section including the zero crossing point, and modulate a frequency of the driving control signal during the frequency modulation section.

The back electromotive force detection unit may include a plurality of back electromotive force detectors connected to a plurality of phases of the motor device, respectively, and each of the back electromotive force detectors may include a low pass filter filtering a voltage of any one of the plurality of phases; and a comparator receiving an output from the low pass filter, as a non-inverting input and a reference input as an inverting input.

The low pass filter may include a resistor and a capacitor connected in parallel, and the capacitor may have capacitance for filtering a frequency modulated by the frequency controller.

The frequency controller may include: a zero crossing estimator estimating a zero crossing point of the back electromotive force and determining the frequency modulation section by providing pre-set time intervals based on the estimated zero crossing point; and a frequency determiner controlling to up-convert a frequency of the driving control signal to a pre-set frequency, when a current time corresponds to the frequency modulation section.

The zero crossing estimator may store history with respect to a zero crossing point of the back electromotive force provided from the back electromotive force detection unit, and estimate the zero crossing point by using an average value of the stored history.

The driving signal generation unit may include: a first triangular wave generator generating a triangular wave having a first frequency, a second triangular wave generator generating a triangular wave having a second frequency higher than the first frequency, and a comparator receiving a triangular wave from the first triangular wave generator or the second triangular wave generator, comparing the received triangular wave with an input signal, and generating and outputting a pulse width modulation (PWM) signal.

The back electromotive force detection unit may include a low path filter based on a frequency of the triangular wave generated by the second triangular wave generator.

According to another aspect of the present invention, there is provided a motor. The motor may include a motor device and a motor driving control apparatus. The motor device may perform a rotational operation according to a driving control signal. The motor driving control apparatus may provide the driving control signal to the motor device to control driving of the motor device, and modulate a frequency of the driving control signal during a section corresponding to a zero crossing point of back electromotive power generated by the motor device.

The motor driving control apparatus may include a driving signal generation unit generating a driving control signal for controlling driving of the motor device; a back electromotive force detection unit detecting back electromotive force of the motor device; a frequency controller providing control to estimate a zero crossing point of the back electromotive force, set a frequency modulation section including the zero crossing point, and modulate a frequency of the driving control signal during the frequency modulation section.

The frequency controller may include: a zero crossing estimator estimating a zero crossing point of the back electromotive force and determining the frequency modulation section by providing pre-set time intervals based on the estimated zero crossing point; and a frequency determiner controlling to up-convert a frequency of the driving control signal to a pre-set frequency, when a current time corresponds to the frequency modulation section.

The driving signal generation unit may include: a first triangular wave generator generating a triangular wave having a first frequency, a second triangular wave generator generating a triangular wave having a second frequency higher than the first frequency, and a comparator receiving a triangular wave from the first triangular wave generator or the second triangular wave generator, comparing the received triangular wave with an input signal, and generating and outputting a pulse width modulation (PWM) signal.

The back electromotive force detection unit may include a low path filter based on a frequency of the triangular wave generated by the second triangular wave generator.

According to another aspect of the present invention, there is provided a motor driving control method. The motor driving control method may be performed by a motor driving control apparatus for controlling driving of a motor device. The motor driving control method may include: detecting back electromotive force generated in the motor device; estimating a zero crossing point of the detected back electromotive force by using the detected back electromotive force, and determining a frequency modulation range by using the estimated zero crossing point; and modulating a frequency of the driving control signal when a current time correspond to the frequency modulation range.

The determining of a frequency modulation range may include: storing history with respect to the zero crossing point of back electromotive force, and estimating the zero crossing point by using an average value of the stored history; and determining a frequency modulation section by giving a pre-set time interval based on the estimated zero crossing point.

The modulating of a frequency and proving the modulated frequency to the motor driving apparatus may include: when a current time corresponds to the frequency modulation range, up-converting the frequency of the driving control signal and providing the same to the motor driving apparatus, wherein the up-converted frequency may be associated with capacitance of a low pass filter included in a back electromotive force detection circuit of the motor driving control apparatus.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
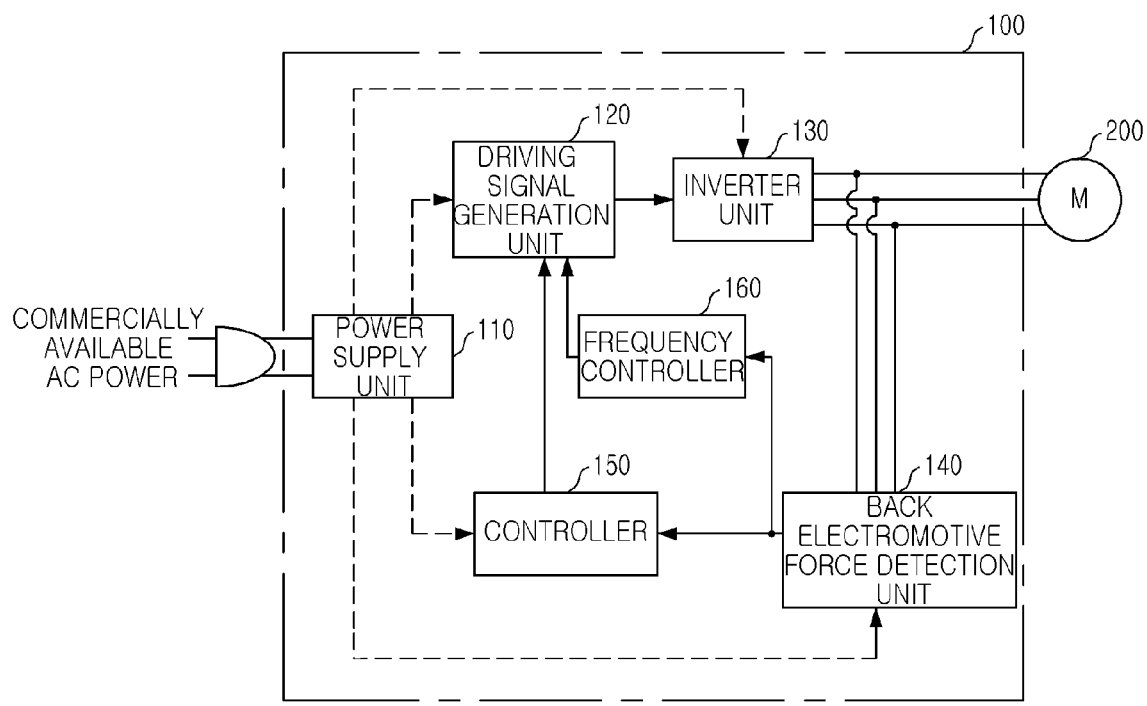
FIG. 1 is a schematic block diagram of a motor driving control apparatus according to an embodiment of the present invention.

Embodiments of the present invention will now be described in detail with reference to the accompanying drawings.

The invention may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the shapes and dimensions of elements may be exaggerated for clarity, and the same reference numerals will be used throughout to designate the same or like components.

Hereinafter, embodiments of the present invention will be described based on a brushless motor for the purposes of description. However, obviously, the scope of the present invention is not necessarily limited to the brushless motor.

Also, hereinafter, a motor itself will be referred to as a motor device 200, and a motor driving control apparatus 100 for controlling driving of the motor device, and the motor device 200 will be generally referred to as a motor.

FIG. 1 is a block diagram of a motor driving control apparatus according to an embodiment of the present invention.

The motor device 200 may perform a rotational operation according to a driving control signal. For example, a magnetic field may be produced by each coil of the motor device 200 according to a driving current provided from the inverter unit 130. A rotor installed in the motor device 200 may be rotated by the magnetic fields produced by the coils.

The motor driving control apparatus 100 may control driving of the motor device 200 by providing driving power to the motor device 200 according to the driving control signal.

The motor driving control apparatus 100 may modulate a frequency of the driving control signal during a section corresponding to a zero-crossing point of back electromotive force (BEMF).

This is because, a frequency of back electromotive force corresponds to a frequency of the driving control signal, and thus, when the frequency of the driving control signal is modulated during the section corresponding to the zero crossing point at which back electromotive force is detected, back electromotive force is detected by the corresponding modulated frequency.

Also, a filter included in a back electromotive force detection circuit, or the like, includes elements such as a capacitor, a resistor, and the like. Here, capacitance of the capacitor has characteristics that it is in inverse proportion to a frequency, the frequency of the driving control signal may be up-converted at the zero crossing point, so a small capacitor may be sufficiently used as the capacitor of the filter. Thus, since capacitance of the capacitor is reduced, a size of the capacitor element is reduced and a filtering delay may also be reduced.

The motor driving control apparatus 100 may include a power supply unit 110, a driving signal generation unit 120, an inverter unit 130, a back electromotive force detection unit 140, a controller 150, and a frequency controller 160.

The power supply unit 110 may supply power to the respective elements of the motor driving control apparatus 100. For example, the power supply unit 110 may convert an alternating current (AC) voltage of commercially available power into a direct current (DC) voltage and supply the same. In the illustrated example, the dotted lines indicate predetermined power supplied from the power supply unit 110.

The driving signal generation unit 120 may provide a driving control signal to the inverter unit 130.

In an embodiment, the driving control signal may be a pulse width modulation (PWM) signal. In this case, the driving signal generation unit 120 may adjust a duty of the PWM signal by applying a variable DC level to a predetermined reference waveform (e.g., a triangular wave).

The driving signal generation unit 102 will be described in detail with reference to FIG. 4, hereinafter.

The inverter unit 130 may enable the motor device 200 to operate. For example, the inverter unit 130 may convert a DC voltage into a multi-phase (e.g., 3-phase to 4-phase) voltage according to a driving control signal and apply the same to coils (corresponding to the plurality of phases) of the motor device 200 to produce magnetic fields, respectively.

In an embodiment, the inverter unit 130 may enable the rotor of the motor device 200 to rotate by sequentially applying phase voltages to a plurality of phases. For example, on the assumption that a stator of the motor device 200 is a permanent magnet having polarity and a rotor has three coils, the inverter unit 130 may sequentially apply phase voltages to the three coils (three phases) to generate magnetic fields. Thus, due to the generated magnetic fields, the rotor may have predetermined polarity, and also, may have sequential polarities for each phase, whereby the rotor rotates about the stator (by being centered thereon).

The back electromotive force detection unit 140 may detect back electromotive force generated by the motor device 200. In detail, when the motor device 200 is rotated, back electromotive force is generated in a coil to which a phase voltage has not been applied, among coils provided in the rotor, due to induced electromotive force. Thus, in this manner, the back electromotive force detection unit 140 may detect back electromotive force generated by the respective coils of the motor device 200.

The back electromotive force detection unit 140 may detect back electromotive force generated in the motor device 200. In detail, when the motor device 200 rotates, back electromotive force is generated in a coil to which a phase voltage has not been applied, among coils provided in the rotor, due to induced electromotive force. Thus, the back electromotive force detection unit 140 may detect back electromotive force generated from the respective coils of the motor device 200.

In an embodiment, the back electromotive force detection unit 140 may calculate a rotational speed of the motor device 200 by using the detected back electromotive force. Alternatively, the back electromotive force detection unit 140 may provide the detected back electromotive force to the controller 150 so as to be used for determining a phase change time of the motor device 200.

The controller 150 may check a phase change time of the motor device 200 and control the driving signal generation unit 120 to generate a driving control signal by using the checked phase change time. For example, the controller 150 may control the driving signal generation unit 120 to perform a phase change at a zero-crossing point of back electromotive force.

The frequency controller 160 may estimate a zero crossing point of back electromotive force, and set a frequency modulation section using the zero crossing point. The frequency controller 160 may control the driving signal generation unit 120 to modulate a frequency of the driving control signal during the frequency modulation section.

The frequency controller 160 will be described in detail with reference to FIG. 3, hereinafter.

Figure 2:
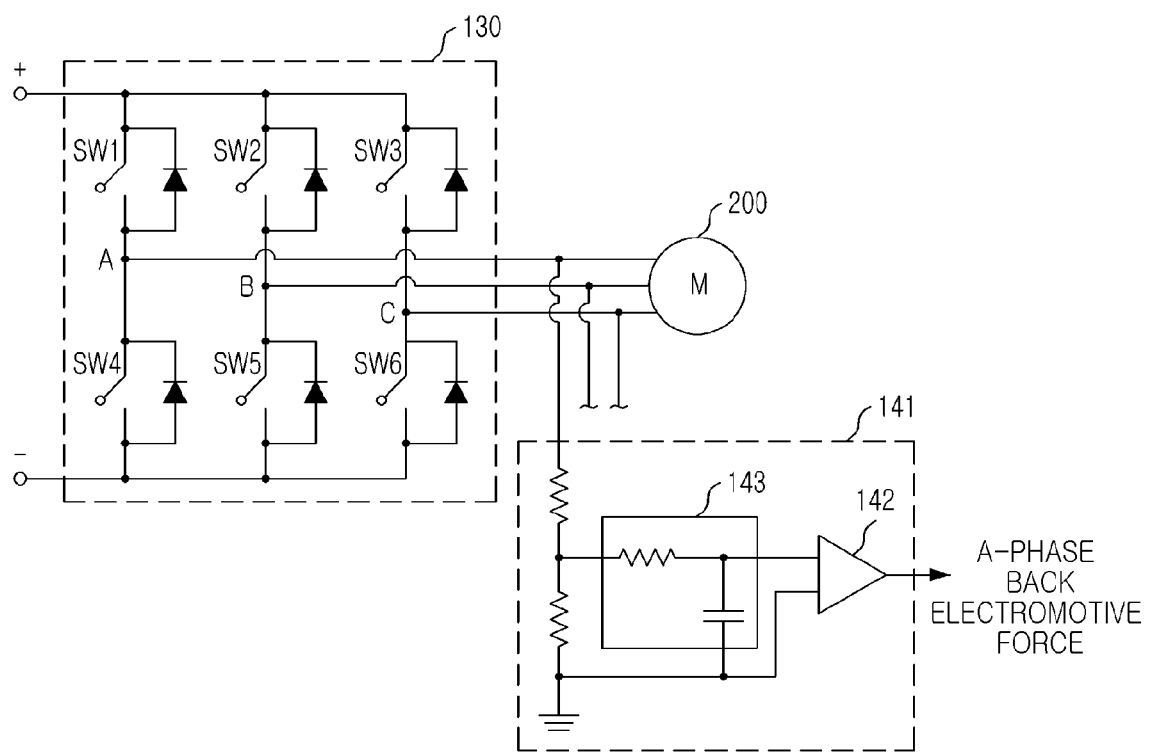
FIG. 2 is a brief circuit diagram illustrating an example of an inverter unit and a back electromotive force detection unit of FIG. 1.

FIG. 2 is a brief circuit diagram illustrating an example of an inverter unit and a back electromotive force detection unit of FIG. 1.

Referring to FIGS. 1 and 2, the inverter unit 130 may include a plurality of higher switch elements SW1 to SW3 connected to a positive (+) power source terminal and a plurality of lower switch elements SW4 to SW6 provided between the respective higher switch elements SW1 to SW3 and a power source terminal. Contacts between the respective higher switch elements SW1 to SW3 and the lower switch elements SW4 to SW6 are connected to respective coils U, V, W.

The higher switch elements SW1 to SW3 of the inverter unit 130 are sequentially turned on, and the lower switch elements SW4 to SW6 are turned on or off to have a state opposite to that of the higher switch elements SW4 to SW6 Here, when the switch element SW1 is turned on, a positive (+) voltage is applied to the U coil of the motor device 200, and as the switch element SW6 is turned on during the operation, a negative (−) voltage is applied to the W coil. Accordingly, magnetic forces having the opposite polarities are generated between the U coil and the W coil and a rotor is rotated by 60 degrees according to the interaction of the magnetic forces. Subsequently, as the switch element SW1 is turned off and the switch element SW2 is turned on, magnetic force having polarity opposite the magnetic force generated by the W coil is generated by the V coil, and according to this magnetic force, the motor device 200 is further rotated by 60 degrees. Similarly, while the switch element SW2 is in an ON state, the switch SW6 is turned off and the switch element SW4 is turned on, magnetic force having polarity opposite to that of the magnetic force of the V coil is generated by the U coil, and the rotor is further rotated by 60 degrees. Next, as the switch element SW2 is turned off, the switch element SW3 is turned on, magnetic forces having opposite polarities are generated by the U coil and the W coil, the motor device 200 is further rotated by 60 degrees, the switching element SW4 is subsequently turned off and the switch element SW5 is turned on, and thus, the rotor is rotated by 60 degrees by the magnetic forces of the U coil and the V coil.

As this process is repeatedly performed, the rotor is continuously rotated to operate the motor device 200.

As described above, when the motor device 200 rotates, back electromotive force is generated in a coil to which a phase voltage has not been applied among the respective coils U, V, and W, and the back electromotive force detection unit 140 may detect the back electromotive force.

The back electromotive force detection unit 140 may include a plurality of back electromotive force detectors 141 connected to a plurality of phases of the motor device 200, respectively. In the illustrated example, the motor device 200 has 3 phases, so the back electromotive force detection unit 140 may include three back electromotive force detectors 141.

The back electromotive force detector 141 may include a comparator 142 and a low pass filter 143.

The low pass filter 143 may filter a voltage of any one of the plurality of phases, and the comparator 142 may detect back electromotive force upon receiving an output from the low pass filter 143 as a non-inverting input and a reference voltage as an inverting input.

Here, the low pass filter 143 includes a resistor and a capacitor connected in parallel. The capacitor has capacitance in inverse proportion to a frequency of an input signal of the low pass filter 143. Thus, when a frequency of an input signal is high, low capacitance is sufficient, but if a frequency of an input signal is low, high capacitance is required. Also, as capacitance of the capacitor is increased, a filtering delay is increased.

Thus, in an embodiment of the present invention, when a current time corresponds to a section in which back electromotive force is detected, a frequency of the driving control signal is up-converted to up-convert the frequency of the back electromotive force, and thus, a capacitor having relatively low capacitance may be used. To this end, the capacitor of the low pass filer 143 may have capacitance for filtering a frequency modulated by the frequency controller 160.

Accordingly, a size of the back electromotive force detection circuit can be reduced and a filtering delay may be reduced to prevent ripples in the motor device 200, ensuring a stable operation.

Figure 3:
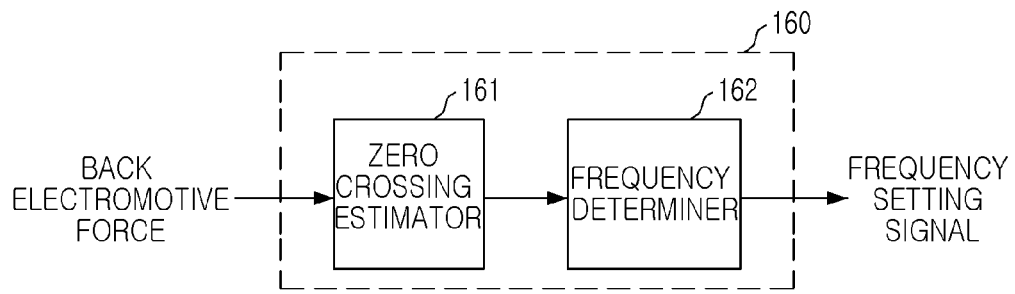
FIG. 3 is a view illustrating a configuration of an example of a frequency controller of FIG. 1.

FIG. 3 is a view illustrating a configuration of an example of the frequency controller of FIG. 1. Hereinafter, the frequency controller 160 will be described in detail with reference to FIGS. 1 through 3.

The frequency controller 160 may include a zero crossing estimator 161 and a frequency determiner 162.

The zero crossing estimator 161 may estimate a zero crossing point of back electromotive force, and provide a pre-set time interval based on the estimated zero crossing point to determine a frequency modulation section. Namely, the frequency modulation section determined by the zero crossing estimator 161 may include a back electromotive force detection time of the back electromotive force detection unit 140. This is to control driving of the motor device 200 by a general frequency during a period in which back electromotive force is not detected, and use a modulated frequency during a section in which back electromotive force is detected (i.e., a frequency modulation section). In this manner, capacitance of the capacitor of the low pass filter 143 can be reduced as described above.

In an embodiment, the zero crossing estimator 161 may store history with respect to a zero crossing point of back electromotive force provided from the back electromotive force detection unit 140, and estimate a zero crossing point by using an average value of the stored history. For example, the zero crossing estimator 161 may include $2^n$ number of memories and shift registers. In this example, information regarding zero crossing point of back electromotive force is stored in the $2^n$ number of memories and shifted by using the shift registers, thus calculating an average value with the simple configuration.

When a current time corresponds to a frequency modulation section, the frequency determiner 162 may up-convert a frequency of the driving control signal to a pre-set frequency. Namely, when a current time corresponds to the frequency modulation section, the frequency determiner 162 may provide a control signal (referred to as a frequency setting signal) for modulating a frequency to the driving signal generation unit 120.

Figure 4:
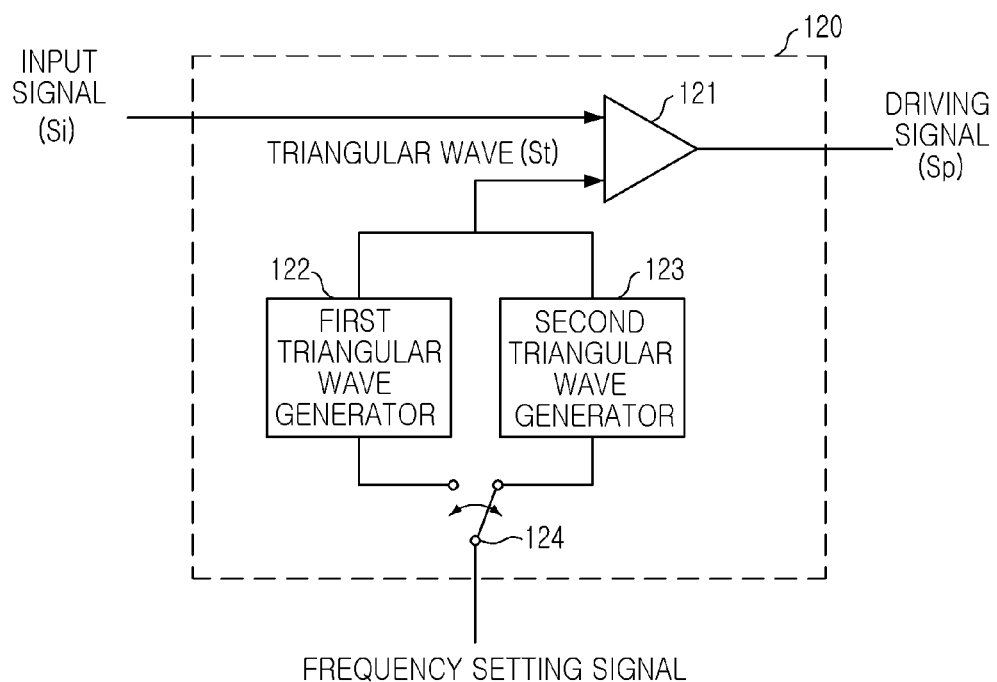
FIG. 4 is a view illustrating a configuration of an example of a driving signal generation unit of FIG. 1.
Figure 5:
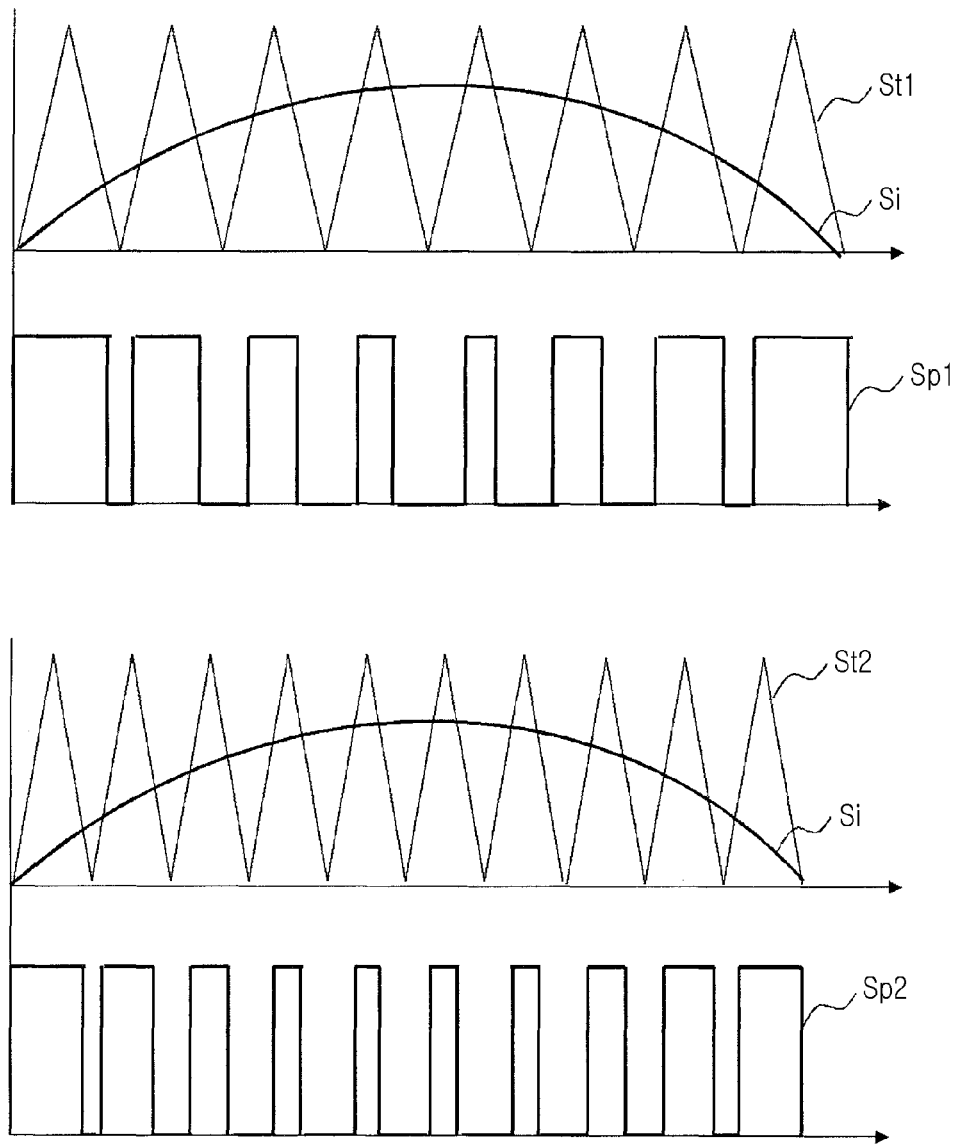
FIG. 5 is a reference graph showing changes in frequencies of a driving control signal according to frequencies of triangular waves.

FIG. 4 is a view illustrating a configuration of an example of a driving signal generation unit of FIG. 1. FIG. 5 is a reference graph showing changes in frequencies of a driving control signal according to frequencies of triangular waves.

Figure 6:
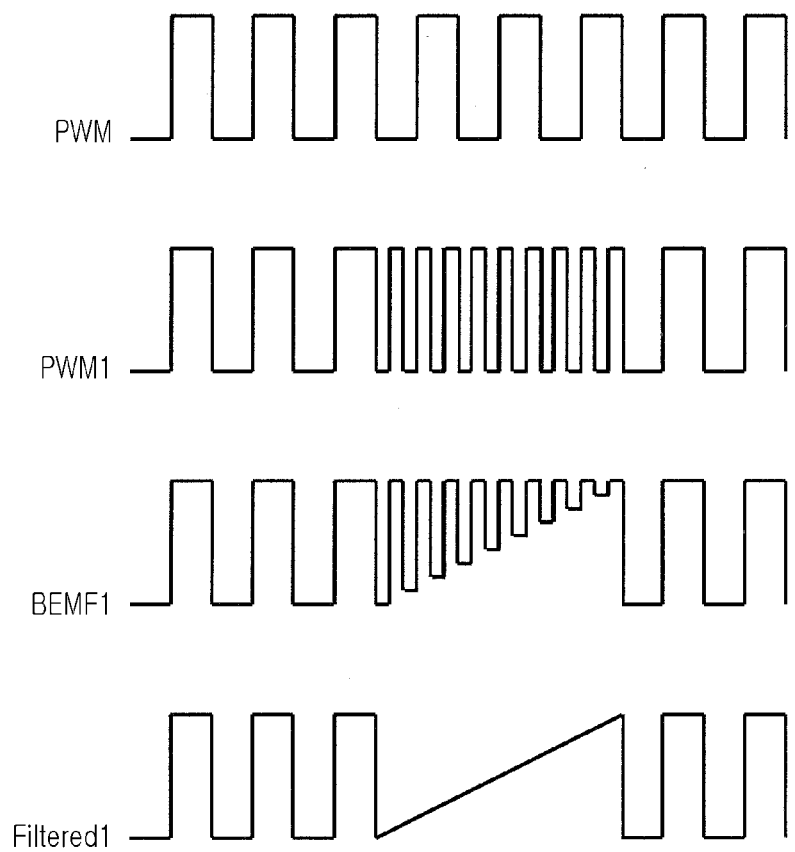
FIG. 6 is a reference graph showing frequency modulation according to an embodiment of the present invention.

FIG. 6 is a reference graph showing frequency modulation according to an embodiment of the present invention.

Hereinafter, a driving signal generation unit 120 will be described in detail with reference to FIGS. 4 through 6.

The driving signal generation unit 120 may synthesize triangular waves St to an input signal Si to generate a driving signal Sp. Here, the driving signal generation unit 120 may modulate a frequency of the triangular waves St to modulate a frequency of the driving signal Sp.

In detail, the driving signal generation unit 120 may include a comparator 121, a first triangular wave generator 122, a second triangular wave generator 123, and a switch 124.

The first triangular wave generator 122 and the second triangular wave generator 123 may generate triangular waves having different frequencies. For example, the first triangular wave generator 122 may generate a triangular wave having a first frequency, and the second triangular wave generator 123 may generate a triangular wave having a second frequency higher than the first frequency.

The switch 124 may operate any one of the first triangular wave generator 122 and the second triangular wave generator 123 according to a frequency setting signal. For example, the frequency setting signal may be determined as an ON/OFF value of the switch 124. Thus, the frequency determiner 162 may generate a frequency setting signal to turn on the switch 124 when a current time corresponds to the frequency modulation section, and turn the frequency determiner 162 may turn on the switch 124, and to turn off the switch 124 when a current time does not correspond to the frequency modulation section.

The comparator 121 may receive the triangular wave St from the first triangular wave generator 122 or the second triangular wave generator 123, and compare the received triangular wave St with the input signal Si to generate a pulse width modulation signal.

FIG. 5 is a graph showing generation of the pulse width modulation. As illustrated, it can be seen that the frequency of the second triangular wave St2 of the second triangular wave generator 123 is greater than that of the first triangular wave St1 of the first triangular wave generator 122. Here, as illustrated, it can be seen that when the input signal Si is the same, the first driving signal Sp1 has a frequency proportional to the first triangular wave St1 and the second driving signal Sp2 has a frequency proportional to the second triangular wave St2.

Thus, in this embodiment, the back electromotive force detection unit 140 may include a low pass filter having a capacitance value fixed based on the frequency of the triangular wave generated by the second triangular wave generator 123.

FIG. 6 is a reference graph showing frequency modulation according to an embodiment of the present invention. Here, signal PWM is an example of a driving control signal in a case in which a frequency modulation did not occur, and signal PWM1 is an example of a driving control signal in a case in which frequency modulation occurred. In the signal PWM 1, a fourth period to a sixth period section corresponds to a frequency modulation section in which a driving control signal has been generated with a high frequency. This may be achieved by increasing the frequency of the triangular wave as described above.

Signal BEMF1 is back electromotive force extracted from the signal PWM 1. As illustrated, it can be seen that the signal BEMF 1 has a frequency corresponding to the signal PWM 1.

When the signal BEMF 1 is filtered by a low pass filter, a signal such as Filtered 1 is obtained. Here, since a section for calculating a zero crossing point of the back electromotive force of the signal BEMF 1, namely, a sloped surface section has a high frequency, capacitance of the low pass filter can be reduced as described above, and thus, a delay is reduced and the motor can be more accurately driven.

Figure 7:
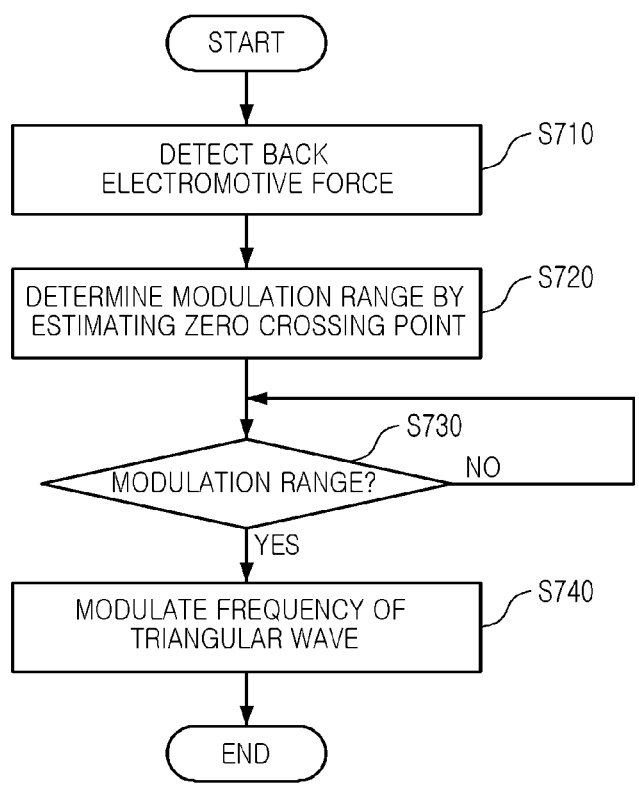
FIG. 7 is a flow chart illustrating a motor driving control method according to an embodiment of the present invention.

FIG. 7 is a flow chart illustrating a motor driving control method according to an embodiment of the present invention.

Hereinafter, a motor driving control method according to an embodiment of the present invention will be described with reference to FIG. 7. The motor driving control method according to an embodiment of the present invention is performed by the motor driving control apparatus 100 described above with reference to FIGS. 1 through 6, so a description of content, which is the same or equivalent to that of the foregoing description, will be omitted.

Referring to FIG. 7, the motor driving control apparatus 100 may detect back electromotive force generated according to driving of the motor device 200 (S710).

Thereafter, the motor driving control apparatus 100 may estimate a zero crossing point of the back electromotive force by using the detected back electromotive force, and determine a frequency modulation range by using the estimated zero crossing point (S720).

Thereafter, the motor driving control apparatus 100 determines whether a current time is within the frequency modulation range (S730). When the current time falls within the frequency modulation range (S730, YES), the motor driving control apparatus 100 modulates a frequency of a driving control signal (S740). For example, the motor driving control apparatus 100 may modulate a frequency of the driving control signal by modulating a frequency of a triangular wave.

In an embodiment of operation 5720, the motor driving control apparatus 100 may store history with respect to the zero crossing point of back electromotive force, and estimate a zero crossing point by using an average value of the stored history. Thereafter, the motor driving control apparatus 100 may determine a frequency modulation section by providing a pre-set time interval based o the estimated zero crossing point.

In an embodiment of operation 5740, when a current time falls within the frequency modulation range, the motor driving control apparatus 100 may up-convert the frequency of the driving control signal. Here, the up-converted frequency may have a value associated with capacitance of the low pass filter included in the back electromotive force detection circuit of the motor driving control apparatus 100.

As set forth above, according to embodiments of the invention, the motor can be controlled more accurately by lowering capacitance of the filter by modulating a frequency in a section corresponding to a zero crossing point of back electromotive force.

While the present invention has been shown and described in connection with the embodiments, it will be apparent to those skilled in the art that modifications and variations can be made without departing from the spirit and scope of the invention as defined by the appended claims.

What is claimed is:

1. A motor driving control apparatus comprising:
    a driving signal generation unit generating a driving control signal for controlling driving of a motor device;
    a back electromotive force detection unit detecting back electromotive force of the motor device; and
    a frequency controller providing control to estimate a zero crossing point of the back electromotive force, and modulate a frequency of the driving control signal during a frequency modulation section, wherein the frequency modulation section is a set interval of time from the estimated zero crossing point.

2. The motor driving control apparatus of claim 1, wherein the back electromotive force detection unit comprises a plurality of back electromotive force detectors connected to a plurality of phases of the motor device, respectively, and
    each of the back electromotive force detectors comprises:
        a low pass filter filtering a voltage of any one of the plurality of phases; and
        a comparator receiving an output from the low pass filter, as a non-inverting input and a reference input as an inverting input.

3. The motor driving control apparatus of claim 2, wherein the low pass filter comprises a resistor and a capacitor connected in parallel, and
    the capacitor has capacitance for filtering a frequency modulated by the frequency controller.

4. The motor driving control apparatus of claim 1, wherein the frequency controller comprises:
    a zero crossing estimator estimating a zero crossing point of the back electromotive force and determining the frequency modulation section by providing pre-set time intervals based on the estimated zero crossing point; and
    a frequency determiner controlling to up-convert a frequency of the driving control signal to a pre-set frequency, during the frequency modulation section.

5. The motor driving control apparatus of claim 4, wherein the zero crossing estimator stores history with respect to a zero crossing point of the back electromotive force provided from the back electromotive force detection unit, and estimates the zero crossing point by using an average value of the stored history.

6. The motor driving control apparatus of claim 1, wherein the driving signal generation unit comprises:
    a first triangular wave generator generating a triangular wave having a first frequency;
    a second triangular wave generator generating a triangular wave having a second frequency higher than the first frequency; and
    a comparator receiving a triangular wave from the first triangular wave generator or the second triangular wave generator, comparing the received triangular wave with an input signal, and generating and outputting a pulse width modulation (PWM) signal.

7. The motor driving control apparatus of claim 6, wherein the back electromotive force detection unit comprises a low pass filter based on a frequency of the triangular wave generated by the second triangular wave generator.

8. A motor comprising:
    a motor device performing a rotational operation according to a driving control signal; and
    a motor driving control apparatus providing the driving control signal to the motor device to control driving of the motor device, and modulating a frequency of the driving control signal during a frequency modulation section, wherein the frequency modulation section is a set interval of time from an estimated zero crossing point of back electromotive force.

9. The motor of claim 8, wherein the motor driving control apparatus comprises:
    a driving signal generation unit generating the driving control signal for controlling driving of the motor device;
    a back electromotive force detection unit detecting back electromotive force of the motor device;
    a frequency controller providing control to estimate a zero crossing point of the back electromotive force and modulate a frequency of the driving control signal during the frequency modulation section.

10. The motor of claim 9, wherein the frequency controller comprises:
  a zero crossing estimator estimating a zero crossing point of the back electromotive force and determining the frequency modulation section by providing pre-set time intervals based on the estimated zero crossing point; and
  a frequency determiner controlling to up-convert a frequency of the driving control signal to a pre-set frequency, during the frequency modulation section.

11. The motor of claim 9, wherein the driving signal generation unit comprises:
  a first triangular wave generator generating a triangular wave having a first frequency;
  a second triangular wave generator generating a triangular wave having a second frequency higher than the first frequency; and
  a comparator receiving a triangular wave from the first triangular wave generator or the second triangular wave generator, comparing the received triangular wave with an input signal, and generating and outputting a pulse width modulation (PWM) signal.

12. The motor of claim 11, wherein the back electromotive force detection unit comprises a low pass filter based on a frequency of the triangular wave generated by the second triangular wave generator.

13. A motor driving control method performed by a motor driving control apparatus for controlling driving of a motor device, the method comprising:
  detecting back electromotive force generated in the motor device;
  estimating a zero crossing point of the detected back electromotive force by using the detected back electromotive force;
  determining a frequency modulation section using the estimated zero crossing point, wherein the frequency modulation section is a set interval of time from the estimated zero crossing point; and
  modulating a frequency of a driving control signal during the frequency modulation section.

14. The motor driving control method of claim 13, wherein the estimating of the zero crossing point comprises:
  storing history with respect to the zero crossing point of back electromotive force, and estimating the zero crossing point by using an average value of the stored history.

15. The motor driving control method of claim 13, wherein the modulating of the frequency of the driving control signal comprises:
  up-converting the frequency of the driving control signal and providing the same to the motor driving apparatus,
  wherein the up-converted frequency is associated with capacitance of a low pass filter included in a back electromotive force detection circuit of the motor driving control apparatus.

* * * * *